(12) United States Patent
Jeon et al.

(10) Patent No.: US 12,023,980 B2
(45) Date of Patent: Jul. 2, 2024

(54) SUSPENSION APPARATUS FOR VEHICLE

(71) Applicant: HYUNDAI MOBIS CO., LTD., Seoul (KR)

(72) Inventors: Jae Woong Jeon, Yongin-si (KR); Jin Wook Joo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/237,052

(22) Filed: Aug. 23, 2023

(65) Prior Publication Data

US 2024/0066935 A1 Feb. 29, 2024

(30) Foreign Application Priority Data

Aug. 24, 2022 (KR) .......................... 10-2022-0106121

(51) Int. Cl.
*B60G 3/28* (2006.01)
*B60G 3/20* (2006.01)

(52) U.S. Cl.
CPC ................. *B60G 3/28* (2013.01); *B60G 3/20* (2013.01); *B60G 2200/144* (2013.01); *B60G 2200/156* (2013.01); *B60G 2202/114* (2013.01); *B60G 2204/121* (2013.01)

(58) Field of Classification Search
CPC .................................... B60G 3/20; B60G 3/28
See application file for complete search history.

(56) References Cited

FOREIGN PATENT DOCUMENTS

| CN | 116534114 A | * | 8/2023 | ............ B60G 3/20 |
|---|---|---|---|---|
| CN | 220315101 U | * | 1/2024 | |
| DE | 10324553 B4 | * | 12/2007 | ............ B60G 11/08 |
| DE | 102019202278 A1 | * | 8/2020 | |
| DE | 202022107068 U1 | * | 2/2023 | ............ B60G 7/001 |
| EP | 0402777 A1 | * | 12/1990 | |
| JP | 6004097 B2 | * | 10/2016 | ............ B60G 15/062 |
| JP | 6167717 B2 | * | 7/2017 | |
| JP | 6365008 B2 | * | 8/2018 | |
| JP | 2019104272 A | * | 6/2019 | ............ B60G 11/08 |
| JP | 2020069972 A | * | 5/2020 | |
| KR | 10-2019-0041855 A | | 4/2019 | |
| WO | WO-2004030971 A1 | * | 4/2004 | ............ B60G 3/01 |
| WO | WO-2014178250 A1 | * | 11/2014 | ............ B60G 15/062 |
| WO | WO-2019111924 A1 | * | 6/2019 | ............ B60G 11/08 |
| WO | WO-2019111991 A1 | * | 6/2019 | ............ B60G 11/08 |
| WO | WO-2023050964 A1 | * | 4/2023 | ............ B60G 11/08 |

* cited by examiner

*Primary Examiner* — Nicole T Verley
(74) *Attorney, Agent, or Firm* — Morgan, Lewis & Bockius LLP (57) ABSTRACT

The suspension apparatus may include a driving unit configured to provide driving power to a wheel, a first knuckle coupled with the driving unit, rotated around a steering axis, and configured to change a steering angle of the wheel, a second knuckle disposed to face the first knuckle and configured to rotatably support the first knuckle, a suspension arm configured to extend from a vehicle body and to support the second knuckle against the vehicle body, a shock absorber connected to the second knuckle and configured to absorb a shock that is applied to the second knuckle, and a rotation restriction member provided between the second knuckle and the shock absorber and configured to restrict the second knuckle from being rotated along with the first knuckle.

13 Claims, 12 Drawing Sheets

SUSPENSION APPARATUS FOR VEHICLE

CROSS-REFERENCE TO RELATED APPLICATION

This application claims priority from and the benefit of Korean Patent Application No. 10-2022-0106121, filed on Aug. 24, 2022, which is hereby incorporated by reference for all purposes as if set forth herein.

BACKGROUND

Technical Field

Exemplary embodiments of the present disclosure relate to a suspension apparatus for a vehicle, and more particularly, to a suspension apparatus for a vehicle, wherein a steering axis and a suspension axis have been separated from each other.

Discussion of the Background

In general, vehicles are globally changed into the extension of a living space not moving means. Accordingly, a purpose built vehicle (PBV) having a generous interior space has been in the spotlight. Such a PBV expands its interior space by applying an in-wheel motor that directly drives a wheel in a way to dispose a driving motor within each wheel, unlike in a common electric vehicle in which a driving motor is present at the position of the existing internal combustion engine.

However, there are problems in that a space within the wheel is narrowed compared to the existing electric vehicle due to the in-wheel motor and a torque steer phenomenon in which the wheel is arbitrarily steered occurs when driving power and braking power are applied to the wheel because a kingpin offset is increased.

The Background technology of the present disclosure is disclosed in Korean Patent Application Publication No. 10-2019-0041855 (published on Apr. 23, 2019 and entitled "STEERING SYSTEM FOR IN-WHEEL MOTOR VEHICLE").

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments are directed to a suspension apparatus for a vehicle, which can prevent a knuckle in which a steering axis and a suspension axis have been separated from each other from being rotated around the suspension axis.

In an embodiment, a suspension apparatus for a vehicle may include a driving unit configured to provide driving power to a wheel, a first knuckle coupled with the driving unit, rotated around a steering axis, and configured to change a steering angle of the wheel, a second knuckle disposed to face the first knuckle and configured to rotatably support the first knuckle, a suspension arm configured to extend from a vehicle body and to support the second knuckle against the vehicle body, a shock absorber connected to the second knuckle and configured to absorb a shock that is applied to the second knuckle, and a rotation restriction member provided between the second knuckle and the shock absorber and configured to restrict the second knuckle from being rotated along with the first knuckle.

The suspension arm may be provided as a pair and the pair of suspension arms may be connected to both ends of the second knuckle, respectively and the rotation restriction member and the shock absorber may be disposed between the pair of suspension arms.

The shock absorber includes a leaf spring may disposed to face the second knuckle and elastically deformed in conjunction with a movement of the second knuckle, and a bracket member may configured to mutually connect the leaf spring and the rotation restriction member.

The length direction of the leaf spring may be parallel to the width direction of the vehicle.

The bracket member may include a bracket body, a first coupling part disposed on one side of the bracket body and coupled with an end of the leaf spring, and a second coupling part disposed on the other side of the bracket body and coupled to both sides of the rotation restriction member.

The rotation restriction member may include an outer pipe coupled with the second knuckle, an inner pipe disposed to be spaced apart from the outer pipe and coupled with the shock absorber, an elastic body disposed between the outer pipe and the inner pipe, and a stiffness reinforcement part disposed within the elastic body and configured to reinforce stiffness of the elastic body.

The stiffness reinforcement part may forms a concentric circle along with the outer pipe and the inner pipe.

The rotation restriction member may further include a stiffness reduction part provided in the stiffness reinforcement part and configured to locally reduce stiffness of the stiffness reinforcement part.

The stiffness reduction part may be formed to penetrate the stiffness reinforcement part in a direction perpendicular to a ground.

The length direction of the stiffness reduction part may extend along the axial direction of the stiffness reinforcement part.

The stiffness reduction part may be provided as a pair and the pair of stiffness reduction parts may be disposed on both sides of the stiffness reinforcement part, respectively.

The outer pipe may be inserted into an insertion hole formed in the second knuckle, and an outer surface of the outer pipe may be pressed in an inner surface of the insertion hole.

The suspension apparatus for a vehicle according to an embodiment of the present disclosure can reduce a kingpin offset value and improve the driving and braking stability of a vehicle because the steering axis and the suspension axis are separated from each other and disposed in the first knuckle and the second knuckle, respectively, which face each other in the width direction of the vehicle.

The suspension apparatus for a vehicle according to an embodiment of the present disclosure can prevent a kingpin offset from being arbitrarily changed by restricting the second knuckle from being integrally rotated along with the first knuckle by the rotation restriction member upon steering operation of a vehicle.

The suspension apparatus for a vehicle according to an embodiment of the present disclosure can prevent the second knuckle from being moved to an excessive width by the shock absorber upon bumping and rebound behavior of a wheel.

The suspension apparatus for a vehicle according to an embodiment of the present disclosure can reduce the weight of a vehicle and a cost price by preventing the second knuckle from being integrally rotated along with the first knuckle even without installing a separate additional link.

DETAILED DESCRIPTION OF THE ILLUSTRATED EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, a suspension apparatus for a vehicle will be described below with reference to the accompanying drawings through various exemplary embodiments.

Figure 1:
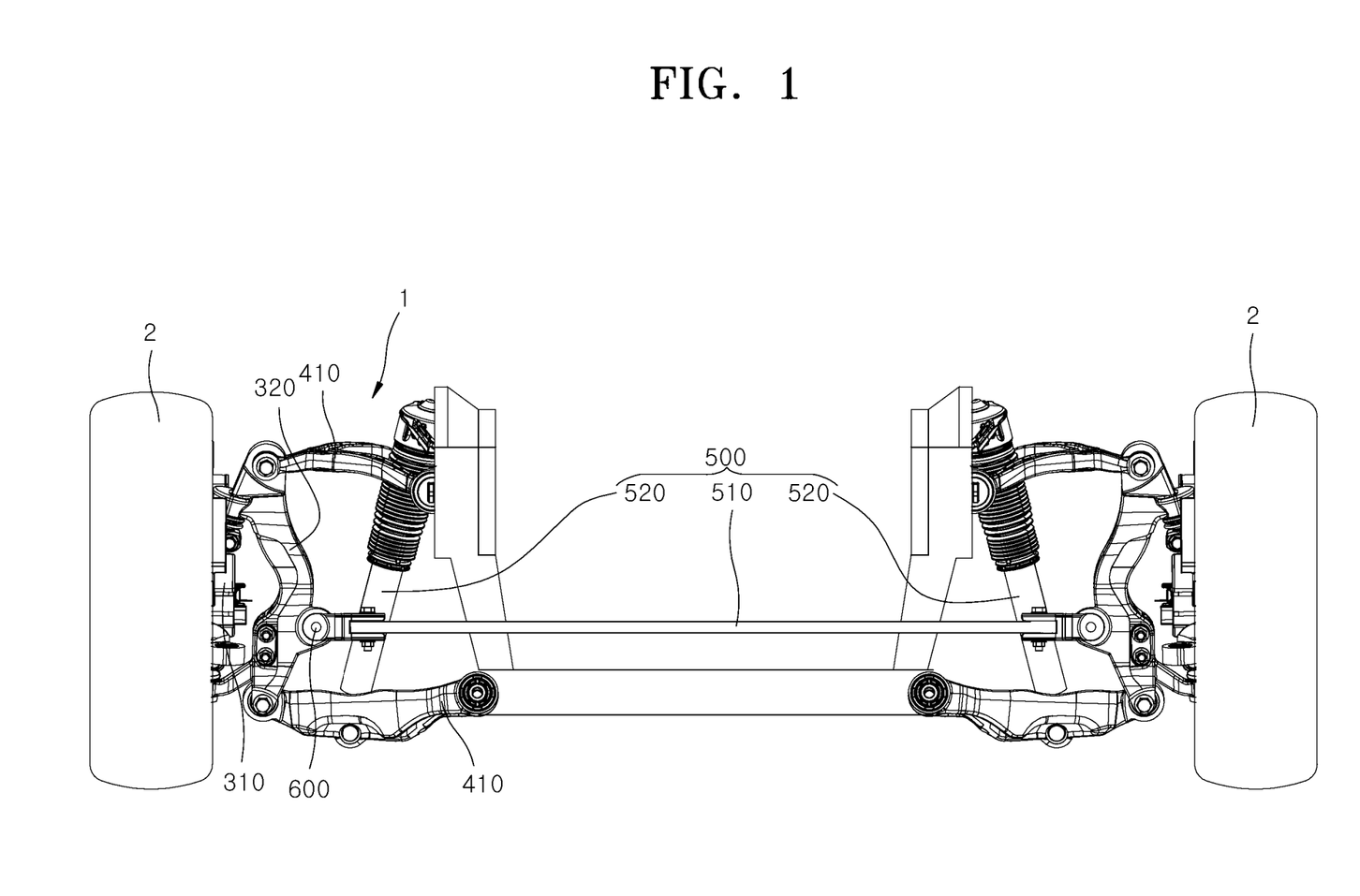
FIG. 1 is a diagram schematically illustrating the state in which a suspension apparatus for a vehicle according to an embodiment of the present disclosure has been installed.
Figure 2:
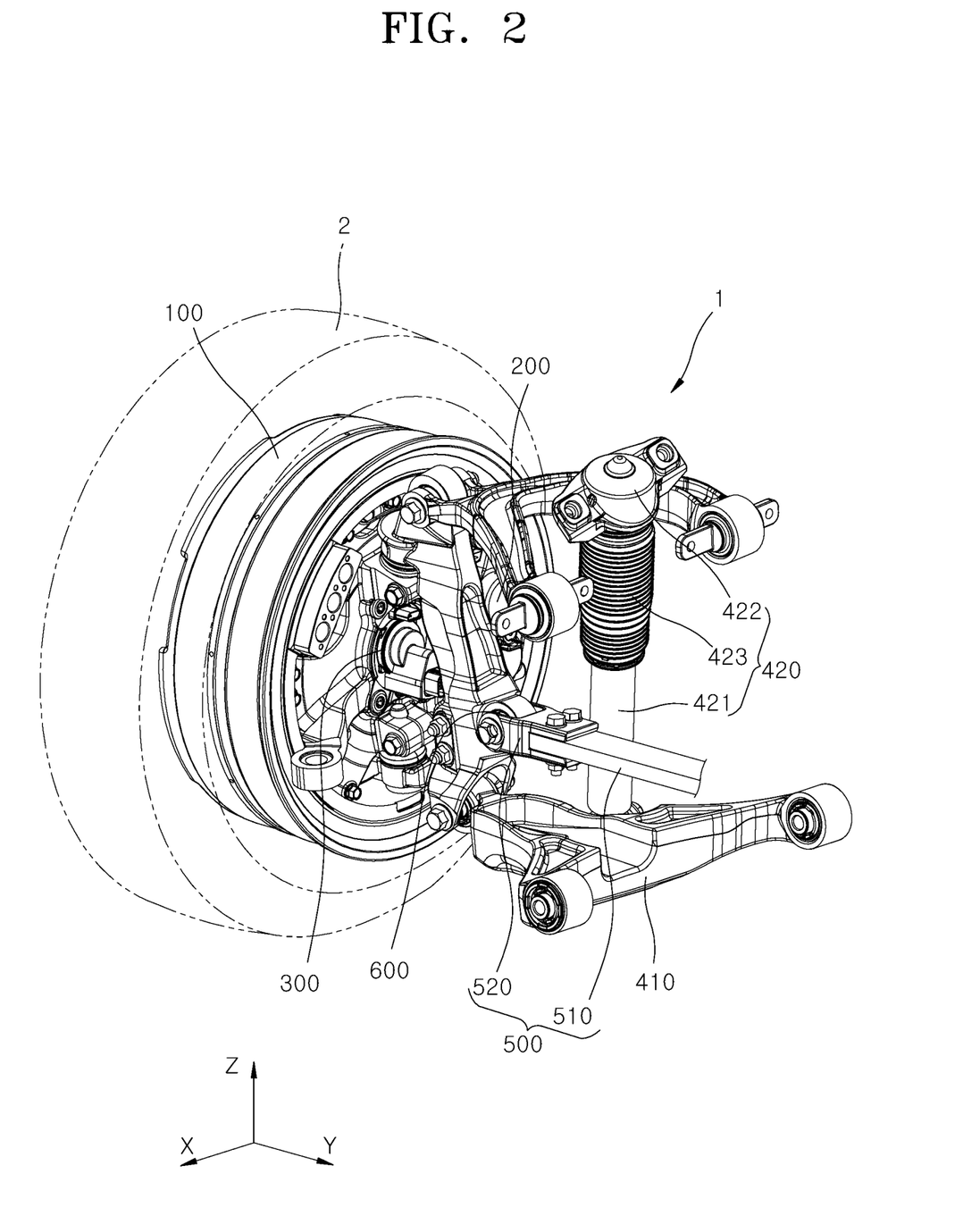
FIG. 2 is a perspective view schematically illustrating a construction of the suspension apparatus for a vehicle according to an embodiment of the present disclosure.
Figure 3:
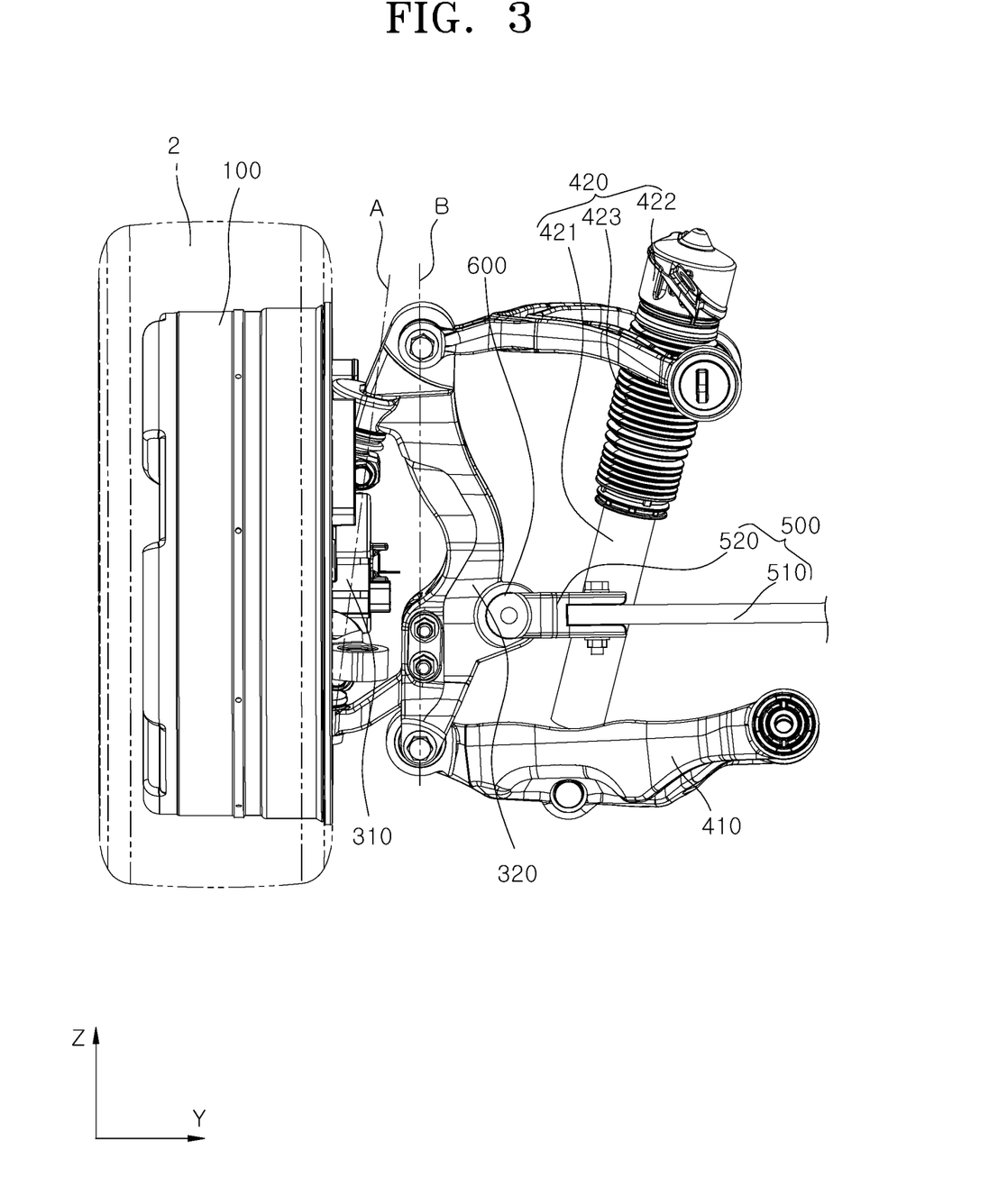
FIG. 3 is a front view schematically illustrating a construction of the suspension apparatus for a vehicle according to an embodiment of the present disclosure.
Figure 4:
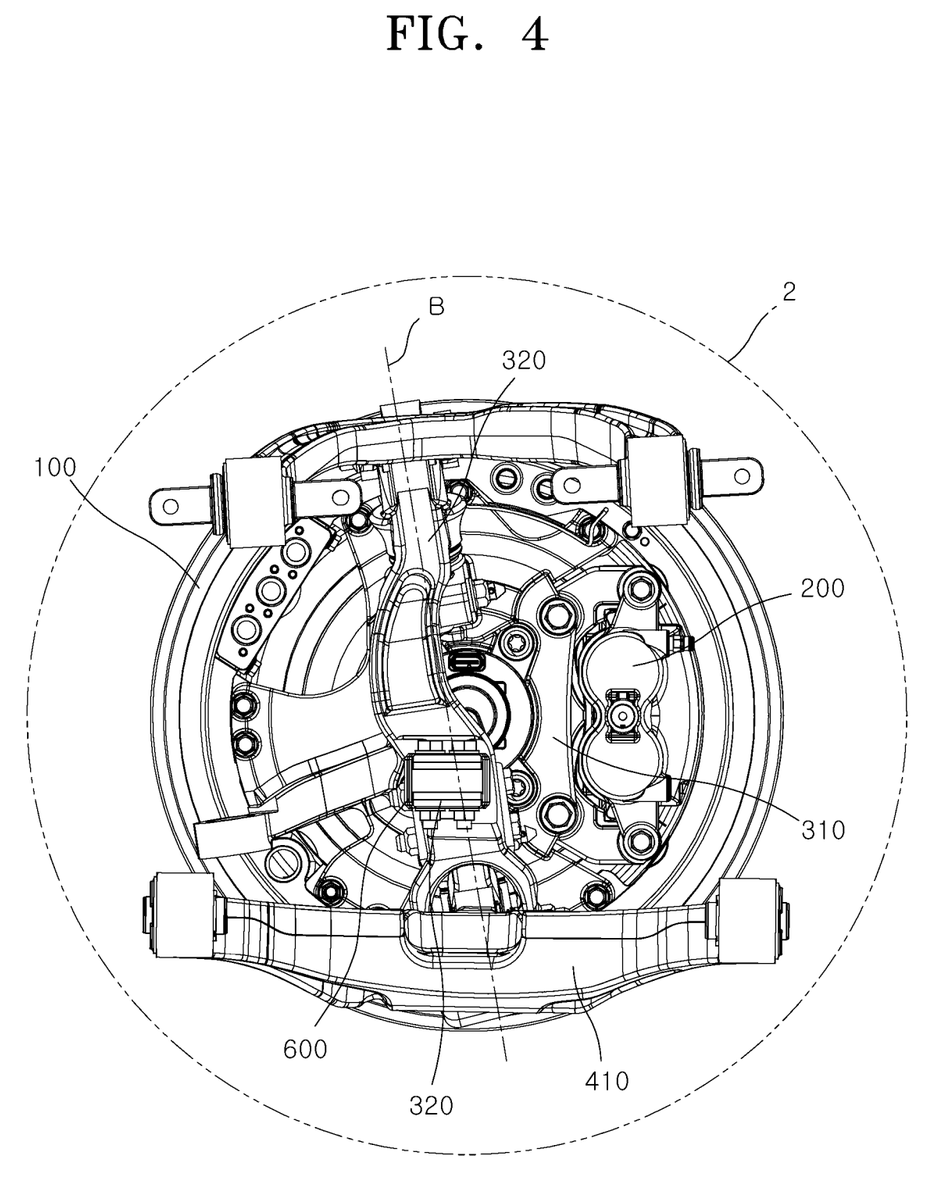
FIG. 4 is a side view schematically illustrating a construction of the suspension apparatus for a vehicle according to an embodiment of the present disclosure.
Figure 5:
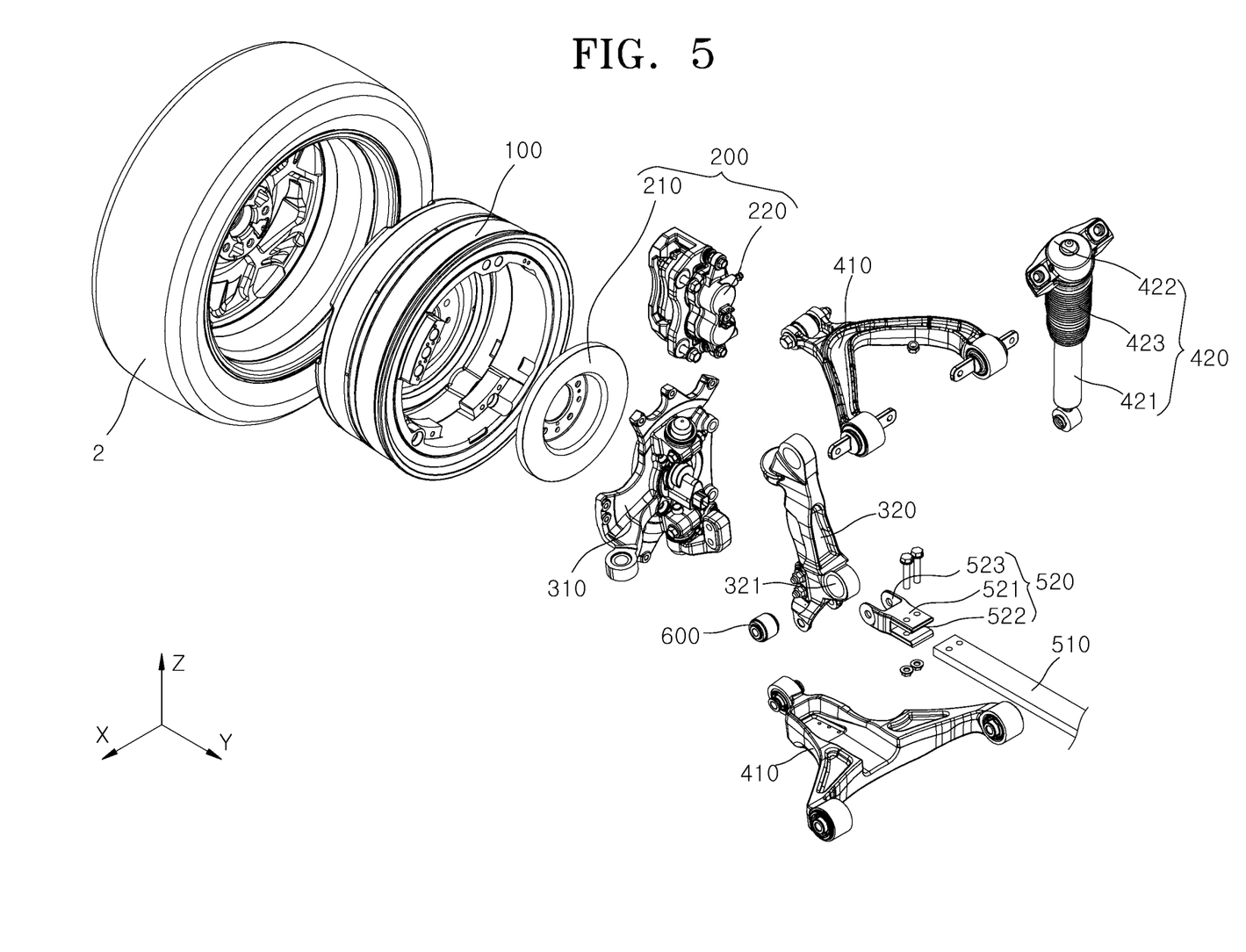
FIG. 5 is an exploded perspective view schematically illustrating a construction of the suspension apparatus for a vehicle according to an embodiment of the present disclosure.

FIG. 1 is a diagram schematically illustrating the state in which a suspension apparatus for a vehicle according to an embodiment of the present disclosure has been installed. FIG. 2 is a perspective view schematically illustrating a construction of the suspension apparatus for a vehicle according to an embodiment of the present disclosure. FIG. 3 is a front view schematically illustrating a construction of the suspension apparatus for a vehicle according to an embodiment of the present disclosure. FIG. 4 is a side view schematically illustrating a construction of the suspension apparatus for a vehicle according to an embodiment of the present disclosure. FIG. 5 is an exploded perspective view schematically illustrating a construction of the suspension apparatus for a vehicle according to an embodiment of the present disclosure.

Referring to FIGS. 1 to 5, a suspension apparatus 1 for a vehicle according to an embodiment of the present disclosure includes a driving unit 100, a braking unit 200, a first knuckle 310, a second knuckle 320, a suspension arm 410, a shock absorber unit 420, a shock absorber 500, and a rotation restriction member 600.

An example in which an X axis, a Y axis, and a Z axis described hereinafter are the length direction of a vehicle, the width direction of the vehicle, and a direction parallel to the height direction of the vehicle, respectively, as illustrated in FIG. 1 is described.

The driving unit 100 is installed within a wheel 2 of the vehicle, and rotates the wheel 2 by providing driving power to the wheel 2. The driving unit 100 is individually installed in each of a plurality of wheels 2, and may independently provide the driving power to each wheel 2.

The driving unit 100 is fixed within the wheel 2, and may be constructed to include a stator that forms a magnetic field by being supplied with power from the battery of the vehicle and a rotor that is rotated by an electromagnetic interaction with the stator and that rotates the wheel 2. The stator and the rotor have their central axes disposed on the same axis as the central axis of the wheel 2, and may be disposed to be mutually stacked in a concentric circle form within the wheel 2.

The braking unit 200 applies or releases braking power by interference with the rotation of the wheel 2.

The braking unit 200 according to an embodiment of the present disclosure may include a brake disk 210 and a brake caliper 220.

The brake disk 210 is connected to the wheel 2 or the driving unit 100, and is rotated in conjunction with the rotation of the wheel 2. The brake disk 210 may be formed to have a disk shape and installed within the wheel 2. The brake disk 210 may be disposed to have its central axis disposed on the same line as the central axis of the wheel 2. The brake disk 210 may be integrally connected to the wheel 2 or the rotor of the driving unit 100 by bolting. Accordingly, when the wheel 2 is rotated, the brake disk 210 may be rotated around its central axis along with the wheel 2. The diameter of the brake disk 210 may be variously designed and changed depending on the diameter of the wheel 2 or the size of the driving unit 100.

The brake caliper 220 applies braking power by pressurizing the brake disk 210 upon braking of the vehicle. The brake caliper 220 may be constructed to include a brake pad disposed to face the brake disk 210, a caliper housing coupled with the first knuckle 310 and configured to support the brake pad so that the brake pad reciprocates within the caliper housing, and a piston installed in the caliper housing in a way to move forward and backward and configured to pressurize the brake pad toward the brake disk 210 or release the pressurization of the brake pad depending on its moving direction.

The first knuckle 310 is coupled with the driving unit 100 and rotated around a steering axis A, and changes a steering angle of the wheel 2. That is, the first knuckle 310 performs a function for providing a mechanical connection to the driving unit 100 and the braking unit 200 and also transferring a steering force to the wheel 2.

The first knuckle 310 may be fixed to the stator of the driving unit 100 by bolting. Furthermore, the first knuckle 310 may rotatably support the rotor of the driving unit 100 through the medium of a wheel bearing. The first knuckle 310 may be fabricated by molding a metal-series material through casting in order to secure sufficient stiffness. The first knuckle 310 is rotatably supported against the second knuckle 320 on the basis of the steering axis A. As illustrated in FIG. 3, the steering axis A may be slantly disposed at a predetermined angle in the X axis with respect to the Z axis by a kingpin slant angle. Accordingly, the first knuckle 310 can reduce a steering force that is necessary for the steering of the wheel 2, and can reduce a shock that is applied to the vehicle upon braking. Furthermore, as illustrated in FIG. 4, the steering axis A may be slantly disposed at a predetermined angle in the Y axis with respect to the Z axis by a caster angle. Accordingly, the first knuckle 310 can improve the straightness of the vehicle, and can provide a restoring force to the wheel 2 after cornering. The first knuckle 310 is connected to a tie rod (not illustrated) or a steering actuator (not illustrated), and may be rotated around the steering axis A by being supplied with a steering force that is generated in response to a manipulation of a steering wheel (not illustrated) by a driver. A detailed shape of the first knuckle 310 is not limited to the shapes illustrated in FIGS. 1 and 2, and may be variously designed and changed within the technical idea of a shape which may be coupled with the driving unit 100 and rotated around the steering axis A.

The second knuckle 320 is disposed to face the first knuckle 310, and rotatably supports the first knuckle 310. The second knuckle 320 may be disposed to face the first knuckle 310 in the width direction of the vehicle. An inner side of the second knuckle 320 may be connected to both ends of the first knuckle 310 on upper and lower sides thereof by a ball joint, so that the second knuckle 320 may rotatably support the first knuckle 310 on the basis of the steering axis A. The second knuckle 320 may be connected to the vehicle body through the medium of the suspension arm 410 to be described later. The second knuckle 320 may reciprocate up and down along a suspension axis B upon bumping and rebound behavior of the wheel 2. In this case, as illustrated in FIG. 3, the suspension axis B is an axis that connects both ends of the second knuckle 320 on upper and lower sides thereof. The suspension axis B may be spaced apart from the steering axis A in the width direction of the vehicle, and may be disposed in parallel to the Z axis on a Y-Z plane. Accordingly, the second knuckle 320 can reduce a kingpin offset value and improve the driving and braking stability of the vehicle because the steering axis A is disposed at a location closer to the wheel 2. Furthermore, as illustrated in FIG. 4, the suspension axis B may be slantly disposed at a predetermined angle on the basis of the Y axis with respect to the Z axis by a caster angle. A detailed shape of the second knuckle 320 is not limited to the shapes illustrated in FIGS. 1 and 2, and may be variously designed and changed within the technical idea of a shape which may rotatably support the first knuckle 310.

The suspension arm 410 extends from the vehicle body, and supports the second knuckle 320 with respect to the vehicle body. The suspension arm 410 may be disposed between the second knuckle 320 and the vehicle body. The suspension arm 410 may have both ends to be rotatably connected to the vehicle body and the second knuckle 320, respectively, by a ball joint or a bush. The suspension arm 410 is rotated around the vehicle body upon bumping and rebound behavior of the wheel 2, and may guide an up and down movement of the second knuckle 320 along the suspension axis B. The suspension arm 410 is provided as a pair, and the pair of suspension arm 410 may be spaced apart from each other up and down in the Z axis and may be disposed to face each other. The pair of suspension arms 410 may be connected to upper and lower ends of the second knuckle 320, respectively. The pair of suspension arms 410 may be formed to have a double wishbone form.

The shock absorber unit 420 is provided elastically in a length direction thereof, and absorbs a shock or vibration that is delivered from a road surface to the vehicle body through the wheel 2.

The shock absorber unit 420 according to the present embodiment may include a cylinder 421, a rod 422, and a dust cover 423.

The cylinder 421 may be formed to have a form of a pipe having the inside empted and the top opened. The cylinder 421 is disposed to be spaced apart from the second knuckle 320 at a predetermined interval in the width direction of the vehicle. The length direction of the cylinder 421 may be parallel to the suspension axis B. The inside of the cylinder 421 is filled with a fluid, such as oil. The bottom of the cylinder 421 is rotatably connected to the side of a suspension arm 410 disposed on the lower side, among the pair of suspension arms 410.

The rod 422 is formed to have a form of a pole having a length direction parallel to the length direction of the cylinder 421. The bottom of the rod 422 is inserted into the cylinder 421, and the top thereof is connected to the vehicle body. The rod 422 slides and moves in the length direction of the cylinder 421 and performs a damping action as the second knuckle 320 reciprocates up and down along the suspension axis B.

The dust cover 423 is disposed to surround the outside of the cylinder 421 and the rod 422, and prevents an alien substance from penetrating between the cylinder 421 and the rod 422. The dust cover 423 may be formed to have a form of a bellows that has an empty inside and is extensible in the length direction thereof. The dust cover 423 is disposed to surround the outside of the cylinder 421 and the rod 422, and may have both ends fixed to the cylinder 421 and the rod 422, respectively.

The shock absorber 500 is connected to the second knuckle 320 through the medium of the rotation restriction member 600 described later, and absorbs a shock that is applied to the second knuckle 320 due to the bumping and rebound behavior of the wheel 2. The shock absorber 500 may be disposed between the pair of suspension arms 410.

Figure 6:
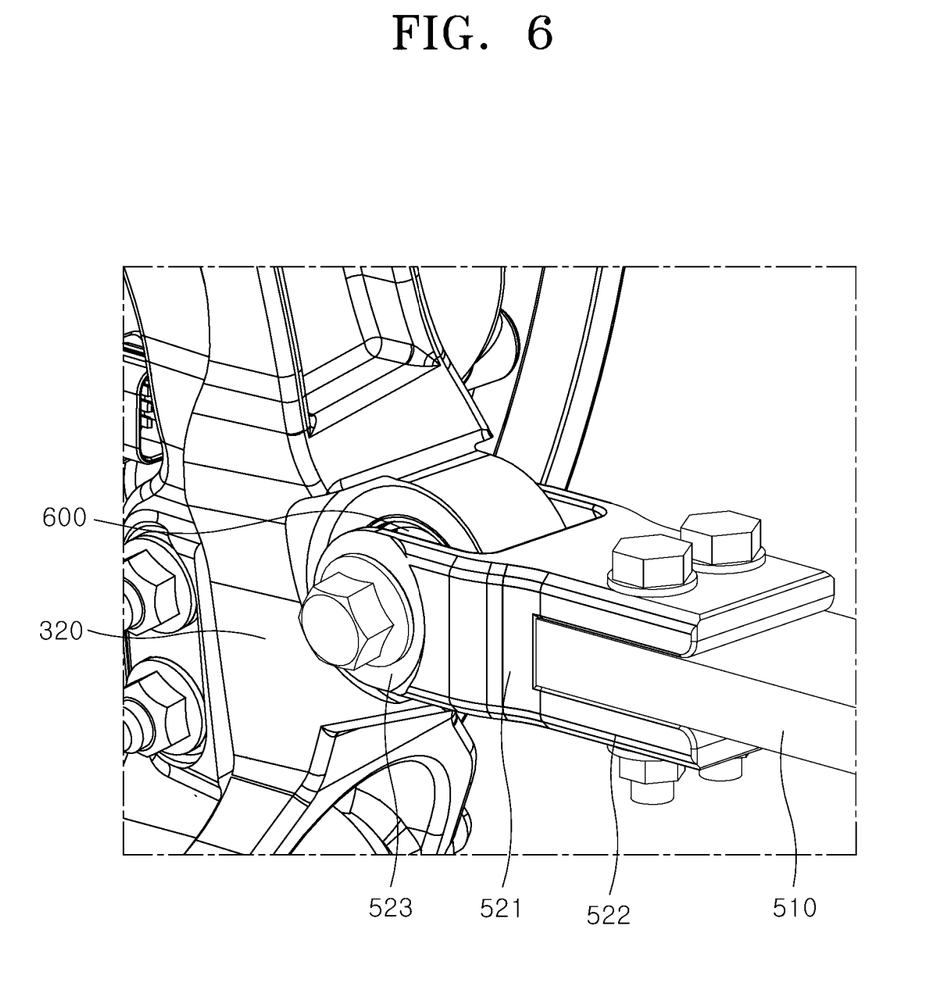
FIG. 6 is an enlarged view schematically illustrating a construction of a shock absorber according to an embodiment of the present disclosure.

FIG. 6 is an enlarged view schematically illustrating a construction of the shock absorber according to an embodiment of the present disclosure.

Referring to FIGS. 1 to 6, the shock absorber 500 according to the present embodiment includes a leaf spring 510 and a bracket member 520.

The leaf spring 510 is disposed to face the second knuckle 320, and is elastically deformed in conjunction with a movement of the second knuckle 320. That is, the leaf spring 510 functions as a component that is autonomously elastically deformed and that absorbs a shock that is applied to the second knuckle 320, as the second knuckle 320 is moved along the suspension axis B by the bumping and rebound behavior of the wheel 2. Accordingly, the leaf spring 510 can prevent the second knuckle 320 from moving to an excessive width.

The leaf spring 510 may be formed to have a form of a sheet spring having a length direction parallel to the width direction of the vehicle. The leaf spring 510 may be disposed between the pair of suspension arms 410. Hereinafter, as illustrated in FIG. 1, an example in which both ends of the leaf spring 510 are disposed to face the second knuckles 320 installed in the pair of wheels 2, respectively, is described. In some embodiments, it is possible that the leaf spring 510 may be disposed to have one end face the second knuckle 320 and the other end face the vehicle body. In this case, the leaf spring 510 may be provided as a pair, and the pair of leaf springs 510 may be disposed to be spaced apart from each other at a predetermined interval in the width direction of the vehicle.

The bracket member 520 is provided between the leaf spring 510 and the rotation restriction member 600, and mutually connects the leaf spring 510 and the rotation restriction member 600. That is, the bracket member 520 is coupled with the rotation restriction member 600 having one side coupled with the leaf spring 510 and the other side coupled with the second knuckle 320, and thus functions as a component that indirectly connects the leaf spring 510 and the second knuckle 320.

The bracket member 520 according to the present embodiment may include a bracket body 521, a first coupling part 522, and a second coupling part 523.

The bracket body 521 is disposed between an end of the leaf spring 510 and the second knuckle 320, and generally supports the first coupling part 522 and the second coupling part 523 that are described later. The bracket member 520 is provided as a pair, and the pair of bracket members 520 may be disposed at both ends of the leaf spring 510, respectively.

The first coupling part 522 is disposed on one side of the bracket body 521, and is coupled with the end of the leaf spring 510. The first coupling part 522 may be formed to have a form of a plate that extends from one side of the bracket body 521 toward the bracket body 521. The first coupling part 522 is provided as a pair, and the pair of first coupling parts 522 may be disposed to be spaced apart from each other at a predetermined interval along the Z axis. The insides of the pair of first coupling parts 522 may come into contact with both sides of the leaf spring 510, respectively. The pair of first coupling parts 522 may be integrally coupled with the end of the leaf spring 510 by a bolt that penetrates the end of the leaf spring 510 up and down.

The second coupling part 523 is coupled with the other side of the bracket body 521, and is coupled with both sides of the rotation restriction member 600. The second coupling part 523 may be formed to have a form of a plate that extends from the other side of the bracket body 521 toward the second knuckle 320. The first coupling part 522 is provided as a pair, and the pair of first coupling parts 522 is disposed to be spaced apart from each other at a predetermined interval in the X axis. The insides of the pair of second coupling parts 523 are disposed to face both ends of an inner pipe 620, respectively, which is provided in the rotation restriction member 600. The pair of second coupling part 523 may be integrally coupled with both ends of the inner pipe 620 by a bolt that penetrates the central axis of the inner pipe 620.

The rotation restriction member 600 is provided between the second knuckle 320 and the shock absorber 500, and mutually connects the second knuckle 320 and the shock absorber 500. The rotation restriction unit 600 restricts the second knuckle 320 from being rotated along with the first knuckle 310. More specifically, when the first knuckle 310 is rotated around the steering axis A, the rotation restriction member 600 may function as a component that induces smooth relative rotation between the first knuckle 310 and the second knuckle 320 by restricting the second knuckle 320 from being rotated around the suspension axis B by rotatory power that is applied from the first knuckle 310. Accordingly, the rotation restriction member 600 can prevent a kingpin offset from arbitrarily increasing as the second knuckle 320 is rotated along with the first knuckle 310 upon steering of the wheel 2. The rotation restriction unit 600 may be disposed between the pair of suspension arms 410.

Figure 7:
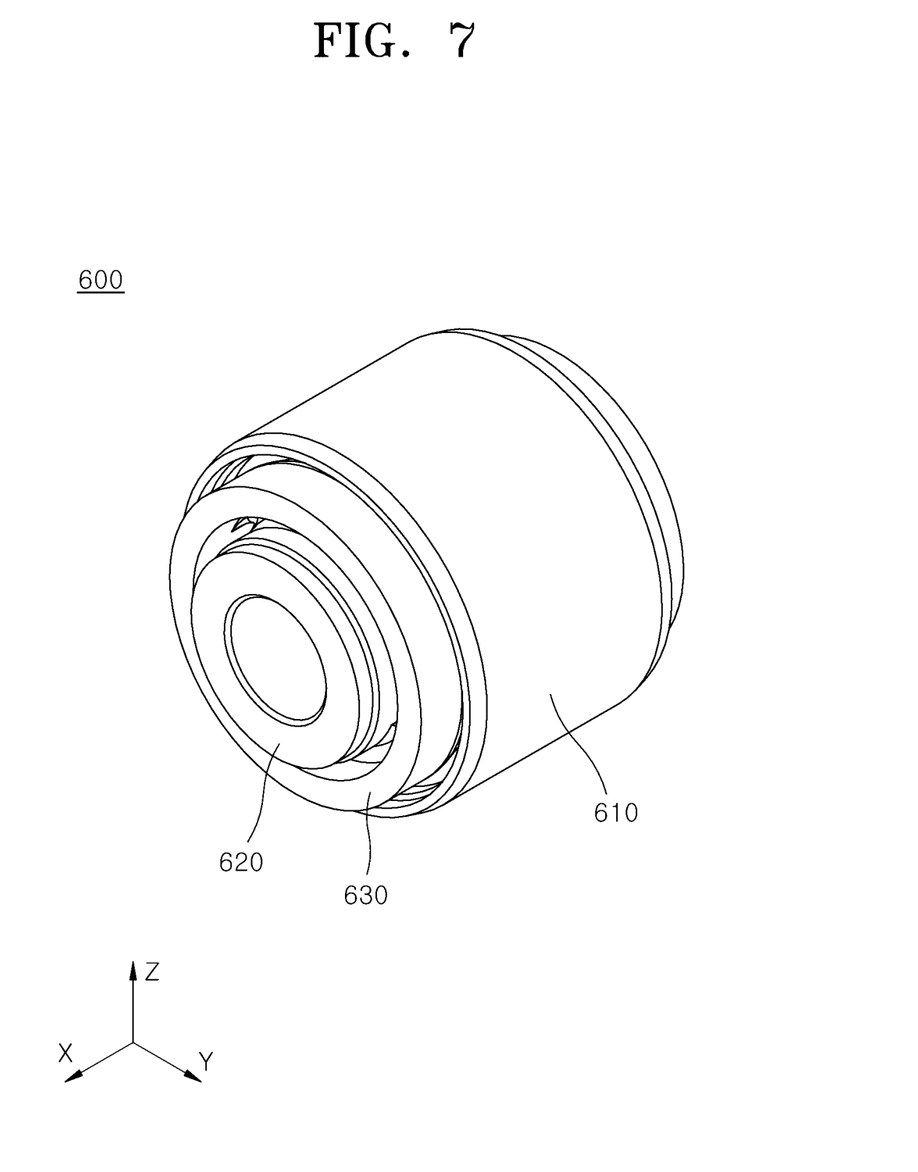
FIG. 7 is a perspective view schematically illustrating a construction of a rotation restriction member according to an embodiment of the present disclosure.
Figure 8:
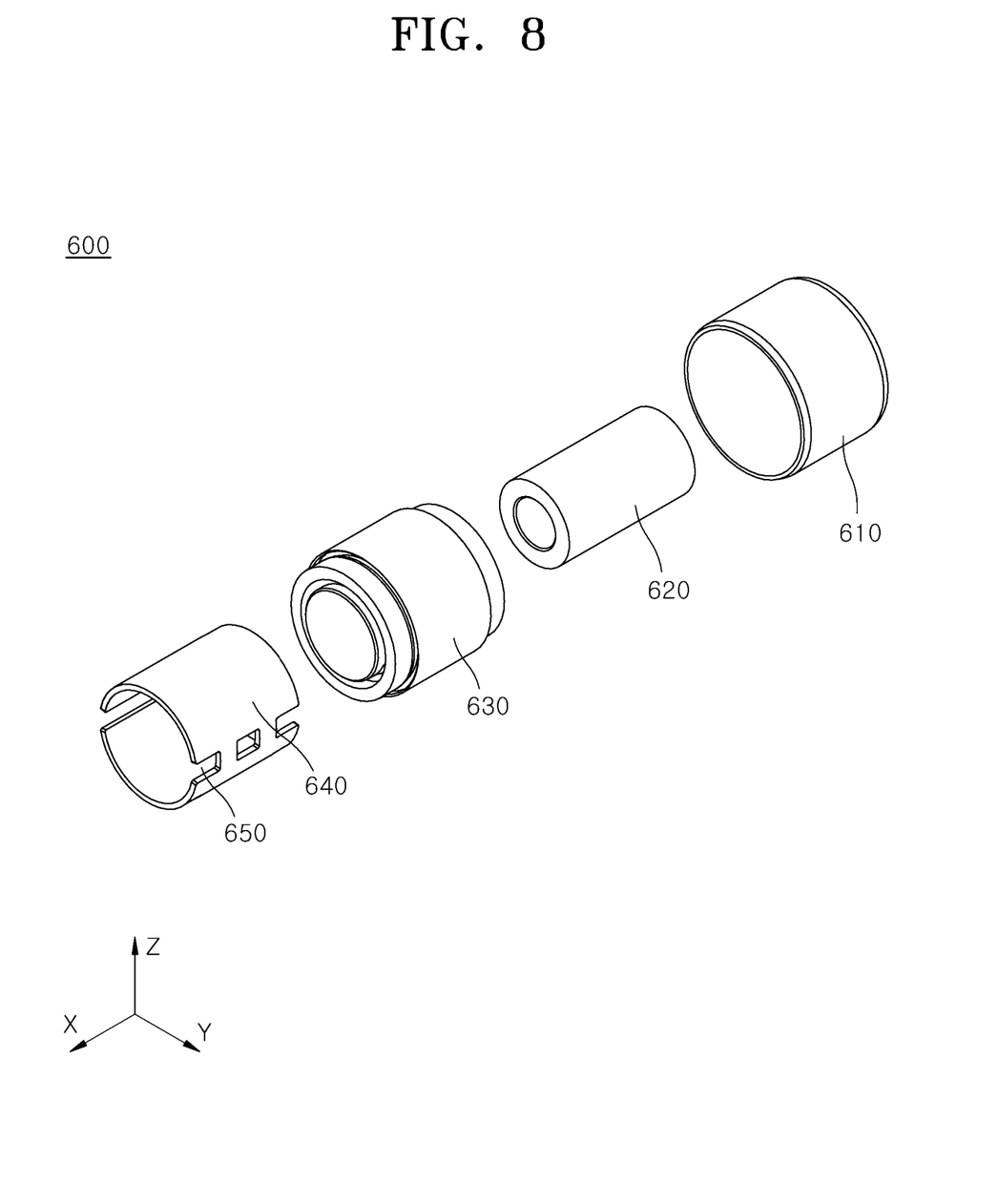
FIG. 8 is an exploded perspective view schematically illustrating a construction of the rotation restriction member according to an embodiment of the present disclosure.
Figure 9:
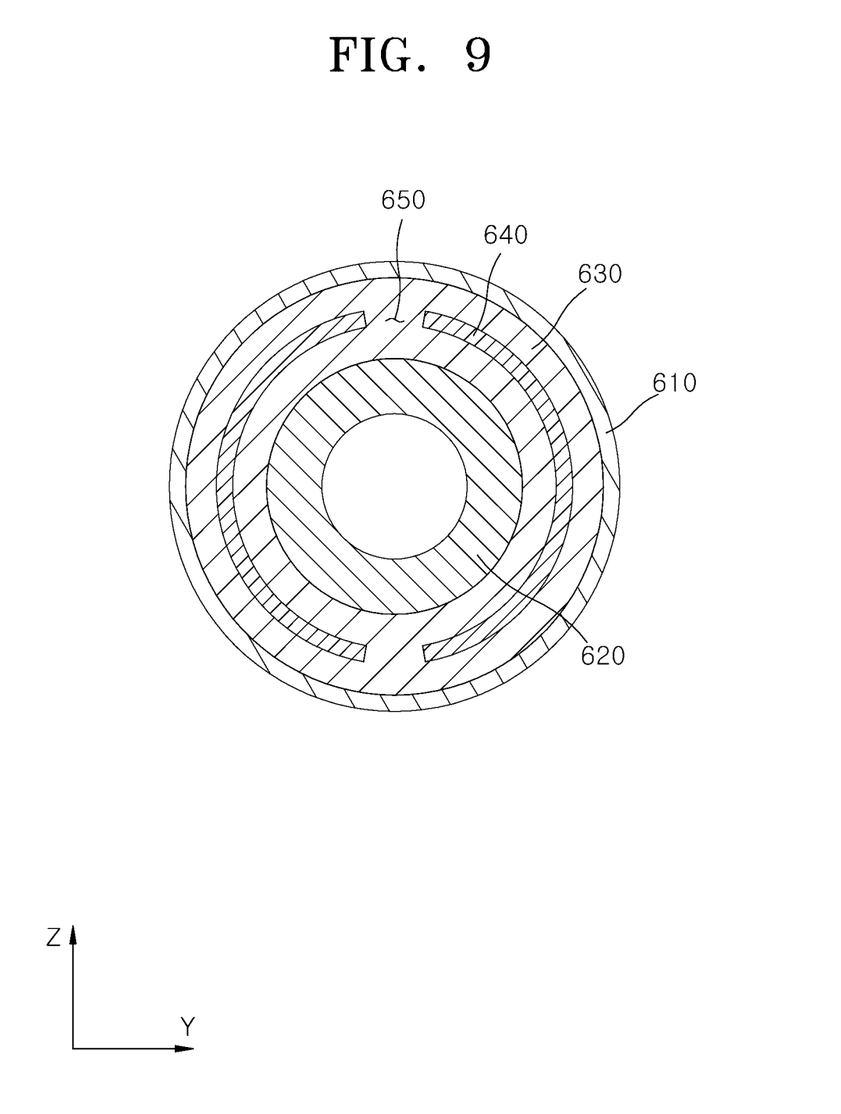
FIG. 9 is a cross-sectional view schematically illustrating a construction of the rotation restriction member according to an embodiment of the present disclosure.

FIG. 7 is a perspective view schematically illustrating a construction of the rotation restriction member according to an embodiment of the present disclosure. FIG. 8 is an exploded perspective view schematically illustrating a construction of the rotation restriction member according to an embodiment of the present disclosure. FIG. 9 is a cross-sectional view schematically illustrating a construction of the rotation restriction member according to an embodiment of the present disclosure.

Referring to FIGS. 1 to 9, the rotation restriction member 600 according to the present embodiment includes an outer pipe 610, the inner pipe 620, an elastic body 630, a stiffness reinforcement part 640, and a stiffness reduction part 650.

The outer pipe 610 is coupled with the second knuckle 320. The outer pipe 610 may be formed to have a form of a pipe having an empty inside and both sides opened. The outer pipe 610 is inserted into an insertion hole 321 formed in a central part of the second knuckle 320. The outer pipe 610 has an outer circumference surface pressed in the inner circumference surface of the insertion hole 321, and is integrally coupled with the second knuckle 320. The outer pipe 610 has a central axis parallel to the X axis.

The inner pipe 620 is disposed to be spaced apart from the outer pipe 610, and is coupled with the shock absorber 500. The inner pipe 620 may be formed to have a form of a pipe having an empty inside and both sides opened. The diameter of the inner pipe 620 is smaller than the diameter of the outer pipe 610. The inner pipe 620 is inserted into the outer pipe 610, and is disposed to have an outer circumference surface spaced apart from the inner circumference surface of the outer pipe 610 at a predetermined interval. The inner pipe 620 has a central axis disposed to be placed on the same axis as the central axis of the outer pipe 610, and is disposed to form a concentric circle along with the outer pipe 610.

The elastic body 630 is disposed between the outer pipe 610 and the inner pipe 620. The elastic body 630 may be formed to have a form of a hollow ring, and may be disposed between the outer pipe 610 and the inner pipe 620. The elastic body 630 is formed of an elastic and deformable material, such as rubber, silicon, or urethane. Accordingly, the elastic body 630 can reduce vibration or noise that occurs in the second knuckle 320 by its own elastic restoring force. The elastic body 630 may have an outer circumference surface and an inner circumference surface integrally coupled with the inner circumference surface of the outer pipe 610 and the outer circumference surface of the inner pipe 620, respectively, through adjustable molding.

The stiffness reinforcement part 640 is disposed within the elastic body 630, and increases the stiffness of the elastic body 630. That is, the stiffness reinforcement part 640 functions as a component that reduces the amount of deformation of the elastic body 630 for the same load by its own stiffness.

The stiffness reinforcement part 640 may be formed of a material having higher stiffness than the stiffness of the elastic body 630, such as steel or plastic. The stiffness of the stiffness reinforcement part 640 may be designed and changed to have various values depending on the size of rotatory power that is delivered to the second knuckle 320 by the rotation of the first knuckle 310 around the steering axis A. The stiffness reinforcement part 640 may be formed to have a form of a pipe having an empty inside and both sides opened. The diameter of the stiffness reinforcement part 640 is smaller than the diameter of the outer pipe 610, and is greater than the diameter of the inner pipe 620. The stiffness reinforcement part 640 forms a concentric circle along with the outer pipe 610 and the inner pipe 620, and is disposed within the elastic body 630. Accordingly, the stiffness reinforcement part 640 can restrict the second knuckle 320 from being rotated around the suspension axis B without interfering with the second knuckle 320 that moves up and down along the suspension axis B, by relatively increasing the rotation stiffness of the elastic body 630 in the Y axis and the Z axis than the rotation stiffness of the elastic body 630 in the X axis.

The stiffness reduction part 650 is provided in the stiffness reinforcement part 640, and locally reduces the stiffness of the stiffness reinforcement part 640. That is, the stiffness reduction part 650 functions as a component that induces a deformation of the elastic body 630 to be concentrated on some area of the stiffness reinforcement part 640 by relatively reducing the stiffness of the corresponding area of the stiffness reinforcement part 640.

The stiffness reduction part 650 may be formed to have a form of a hole that is formed to penetrate the stiffness reinforcement part 640 in a direction perpendicular to the ground, that is, the Z axis. The stiffness reduction part 650 has a length direction that extends along the axial direction of the stiffness reinforcement part 640. The stiffness reduction part 650 is provided as a pair, and the pair of stiffness reduction parts 650 may be disposed on both sides of the stiffness reinforcement part 640 on upper and lower sides thereof, respectively, in the direction of the Z axis. The inside of the stiffness reduction part 650 may be filled with the elastic body 630, or may be maintained as an empty space. Accordingly, the stiffness reduction part 650 can more effectively restrict the rotation of the second knuckle 320 around the Z axis, by securing relatively smaller rotation stiffness of the elastic body 630 on the basis of the Y axis than rotation stiffness of the elastic body 630 on the basis of the Z axis so that a deformation of the elastic body 630 according to a movement of the second knuckle 320 is induced to be concentrated on the rotation of the elastic body 630 around the Y axis.

Hereinafter, an operation of the suspension apparatus 1 for a vehicle according to an embodiment of the present disclosure is described in detail.

Figure 10:
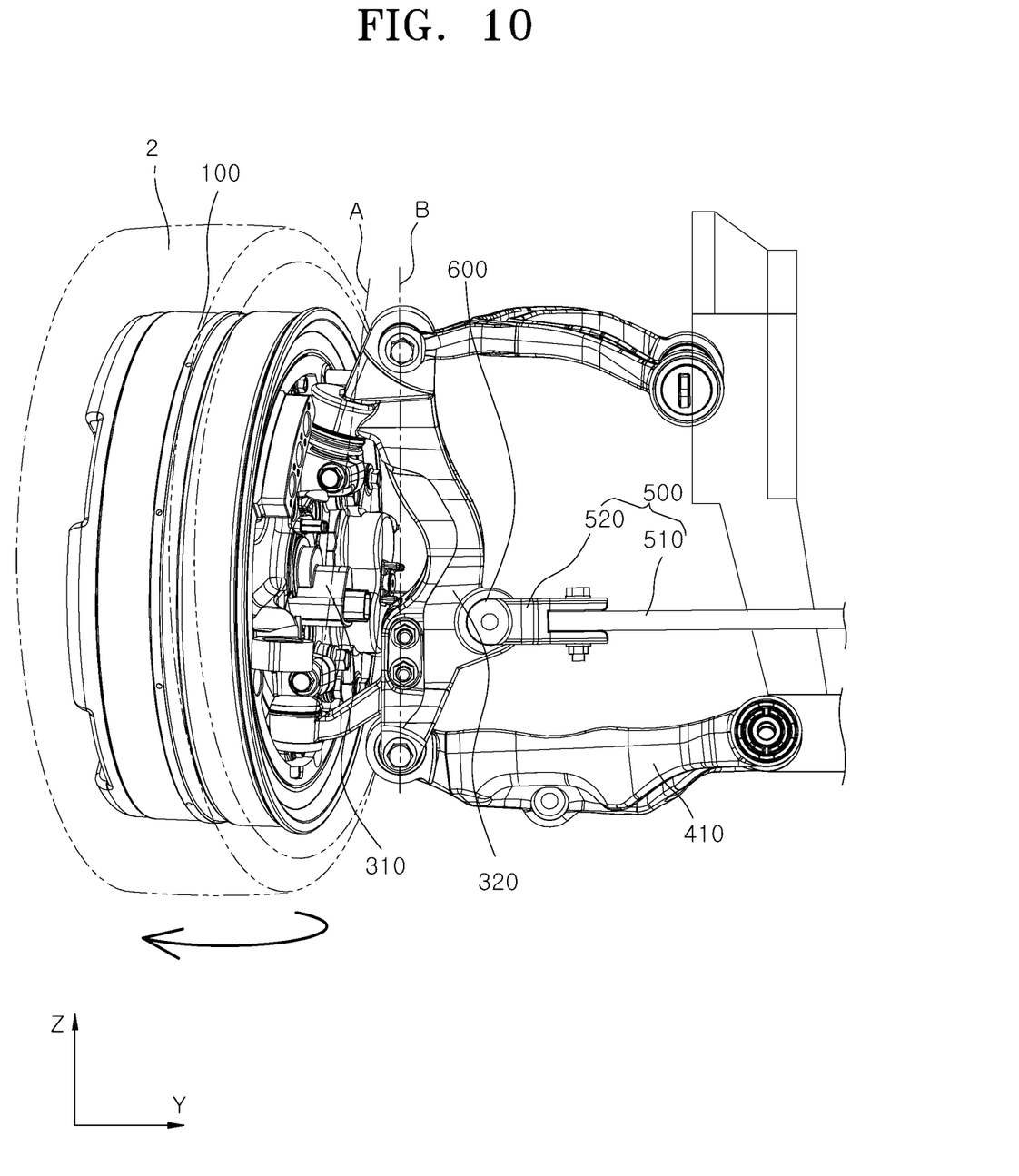
FIG. 10 is an operation diagram schematically illustrating an operation of adjusting, by the suspension apparatus for a vehicle according to an embodiment of the present disclosure, a steering angle of a wheel.

FIG. 10 is an operation diagram schematically illustrating an operation of adjusting, by the suspension apparatus for a vehicle according to an embodiment of the present disclosure, a steering angle of a wheel.

Referring to FIG. 10, upon steering of the vehicle, the first knuckle 310 is rotated around the steering axis A by the steering actuator or the tie rod, and changes the steering angle of the wheel 2.

As the first knuckle 310 is rotated around the steering axis A, rotatory power on the basis of the Z axis is applied to the second knuckle 320 when the suspension axis B does not have a caster angle.

The rotatory power that is applied to the second knuckle 320 is delivered to the outer pipe 610. A torsional load occurs between the outer pipe 610 and the inner pipe 620 coupled to the second knuckle 320 and the bracket member 520, respectively.

The torsional load that is applied between the outer pipe 610 and the inner pipe 620 is offset by an elastic restoring force of the elastic body 630 and the stiffness of the stiffness reinforcement part 640 itself.

In this case, the stiffness reduction part 650 distributes some of the load that is applied to the stiffness reinforcement part 640, so that the elastic body 630 is partially deformed on the basis of the Y axis, but is not deformed on the basis of the Z axis.

Accordingly, the second knuckle 320 maintains the state in which the second knuckle 320 is not rotated around the suspension axis B when the first knuckle 310 is rotated.

Figure 11:
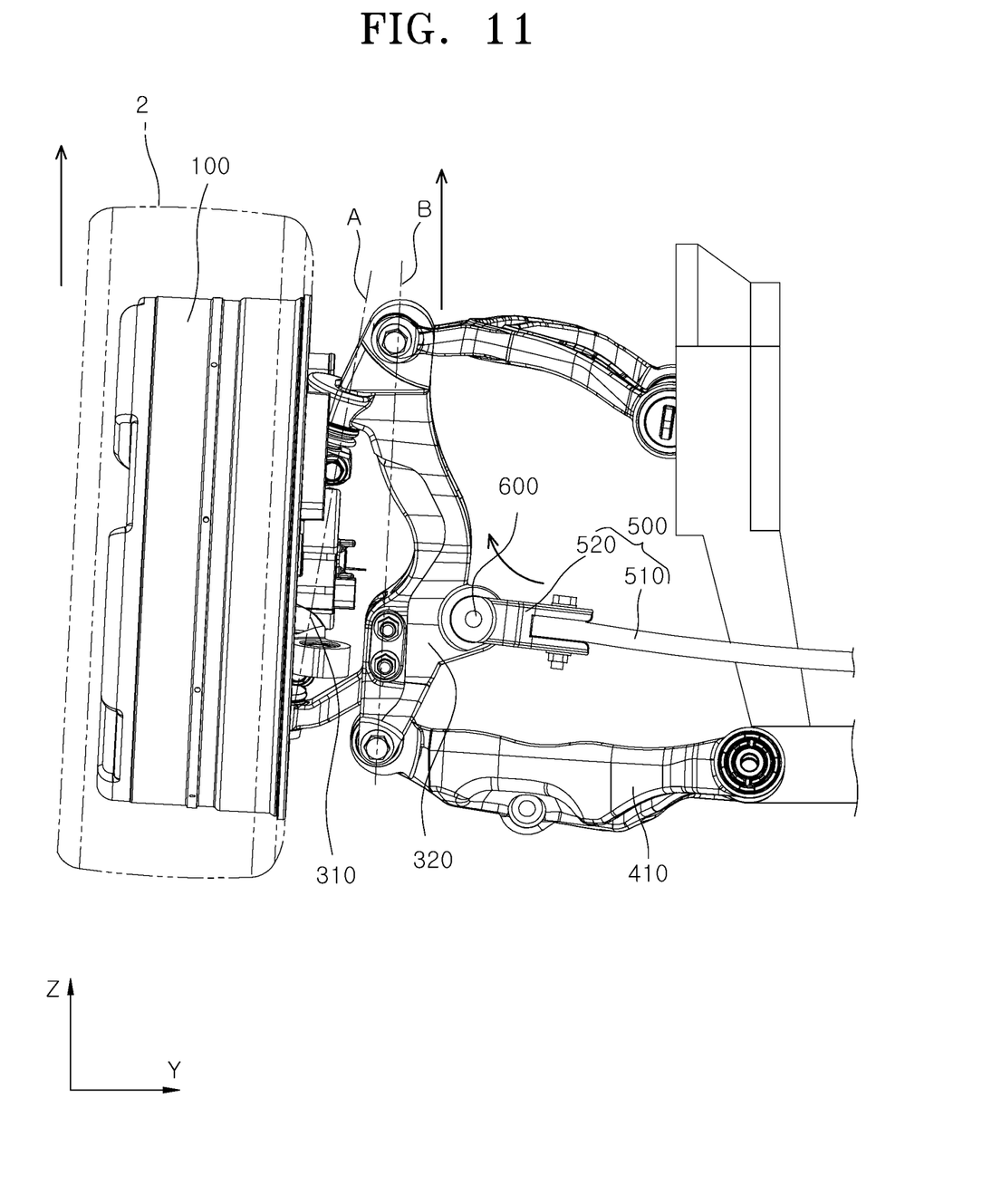
FIGS. 11 and 12 are operation diagrams schematically illustrating operations according to the bumping and rebound behavior of a wheel of the suspension apparatus for a vehicle according to an embodiment of the present disclosure.
Figure 12:
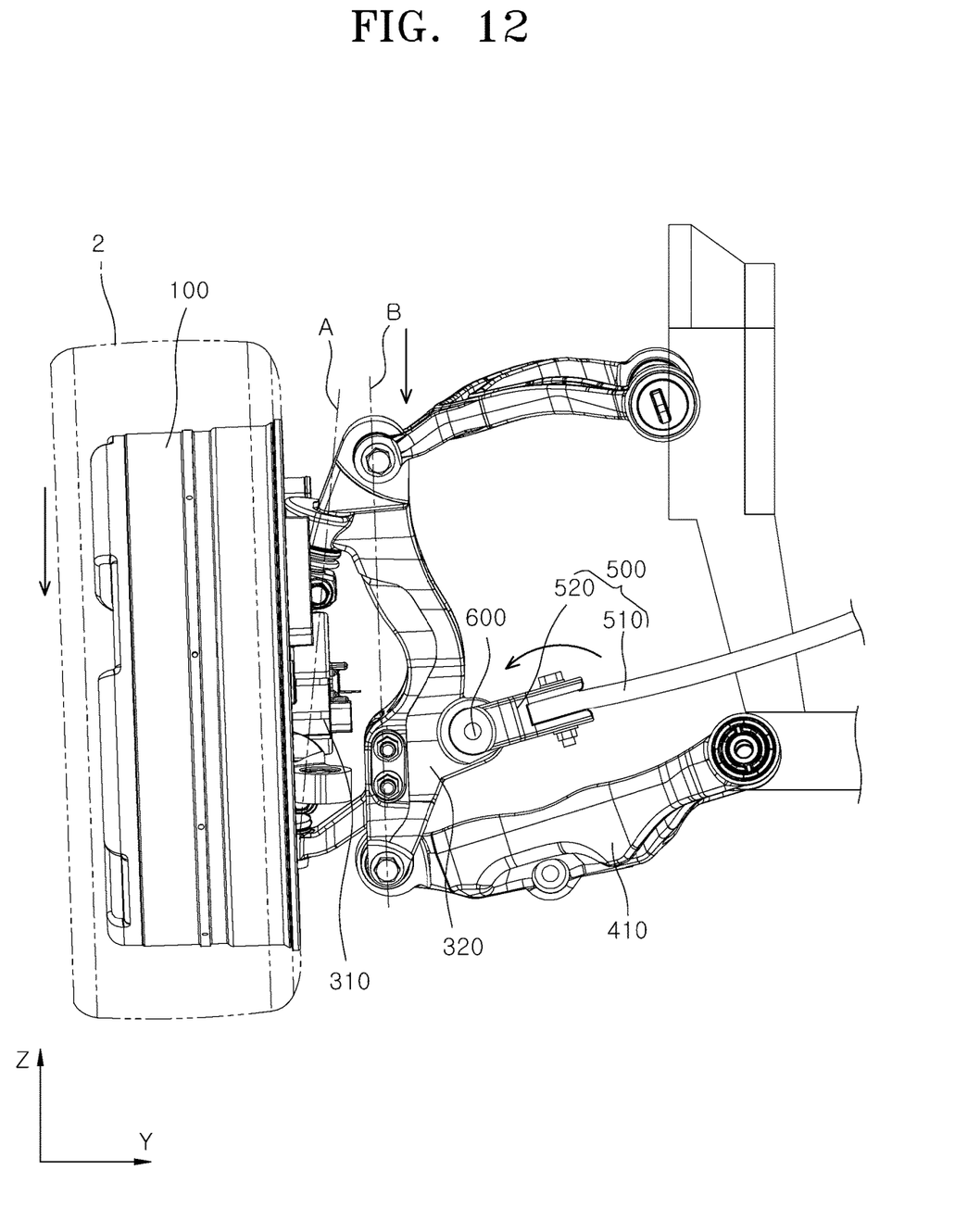

FIGS. 11 and 12 are operation diagrams schematically illustrating operations according to the bumping and rebound behavior of a wheel of the suspension apparatus for a vehicle according to an embodiment of the present disclosure.

Referring to FIGS. 11 and 12, upon bumping and rebound of the wheel 2 attributable to irregularities on a road surface, the second knuckle 320 connected to the wheel 2 through the medium of the first knuckle 310 is moved up and down along the suspension axis B along with the wheel 2.

The leaf spring 510 is elastically deformed in a form in which the leaf spring 510 is bent upward or downward in conjunction with the up and down movement of the second knuckle 320, and absorbs a shock that is applied to the second knuckle 320.

The first knuckle 310 may be rotated around the steering axis A regardless of steering intention of a driver by a bump steer behavior and a caster angle upon bumping and rebound of the wheel 2.

In this case, the second knuckle 320 can maintain the state in which the second knuckle 320 is not rotated around the suspension axis B when the first knuckle 310 is rotated by the aforementioned operation.

The present disclosure has been described above based on the embodiments illustrated in the accompanying drawings, but the embodiments are merely illustrative. A person having ordinary knowledge in the art to which the present disclosure pertains will understand that various modifications and other equivalent embodiments are possible from the embodiments. Accordingly, the technical range of protection of the present disclosure should be determined by the claims.

What is claimed is:

1. A suspension apparatus for a vehicle, comprising:
   a driving unit configured to provide driving power to a wheel;
   a first knuckle coupled with the driving unit, rotatable around a steering axis, and configured to change a steering angle of the wheel;
   a second knuckle disposed to face the first knuckle and configured to rotatably support the first knuckle;
   a suspension arm configured to extend from a vehicle body and to support the second knuckle against the vehicle body;
   a shock absorber connected to the second knuckle; and
   a rotation restriction member provided between the second knuckle and the shock absorber and configured to restrict the second knuckle from being rotated along with the first knuckle.

2. The suspension apparatus of claim 1, wherein:
   the suspension arm is provided as a pair,
   the pair of suspension arms are connected to both ends of the second knuckle, respectively, and
   the rotation restriction member and the shock absorber are disposed between the pair of suspension arms.

3. The suspension apparatus of claim 1, wherein the shock absorber comprises:
   a leaf spring disposed to face the second knuckle and configured to be elastically deformed in conjunction with a movement of the second knuckle; and
   a bracket member configured to mutually connect the leaf spring and the rotation restriction member.

4. The suspension apparatus of claim 3, wherein a length direction of the leaf spring is parallel to a width direction of the vehicle.

5. The suspension apparatus of claim 3, wherein the bracket member comprises:
   a bracket body;
   a first coupling part disposed on one side of the bracket body and coupled with an end of the leaf spring; and
   a second coupling part disposed on the other side of the bracket body and coupled to both sides of the rotation restriction member.

6. The suspension apparatus of claim 1, wherein the rotation restriction member comprises:
   an outer pipe coupled with the second knuckle;
   an inner pipe disposed to be spaced apart from the outer pipe and coupled with the shock absorber;
   an elastic body disposed between the outer pipe and the inner pipe; and
   a stiffness reinforcement part disposed within the elastic body and configured to reinforce stiffness of the elastic body.

7. The suspension apparatus of claim 6, wherein the stiffness reinforcement part has a concentric circle along with the outer pipe and the inner pipe.

8. The suspension apparatus of claim 6, wherein the rotation restriction member further comprises a stiffness reduction part provided in the stiffness reinforcement part and configured to locally reduce stiffness of the stiffness reinforcement part.

9. The suspension apparatus of claim 8, wherein the stiffness reduction part penetrates the stiffness reinforcement part.

10. The suspension apparatus of claim 8, wherein a length direction of the stiffness reduction part extends in an axial direction of the stiffness reinforcement part.

11. The suspension apparatus of claim 9, wherein:
    the stiffness reduction part is provided as a pair, and
    the pair of stiffness reduction parts are disposed on both sides of the stiffness reinforcement part, respectively.

12. The suspension apparatus of claim 6, wherein the outer pipe is inserted into an insertion hole formed in the second knuckle, and an outer surface of the outer pipe is pressed in an inner surface of the insertion hole.

13. The suspension apparatus of claim 1, wherein the shock absorber is configured to absorb a shock that is applied to the second knuckle.

* * * * *